United States Patent
Haynes

(10) Patent No.: US 11,105,424 B2
(45) Date of Patent: Aug. 31, 2021

(54) CROWNED ANTI-ROTATION DEVICE FOR CIRCUMFERENTIAL SEALS

(71) Applicant: Kaydon Ring & Seal, Inc., Baltimore, MD (US)

(72) Inventor: George Perry Haynes, Baltimore, MD (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 281 days.

(21) Appl. No.: 16/265,493

(22) Filed: Feb. 1, 2019

(65) Prior Publication Data

US 2020/0248816 A1    Aug. 6, 2020

(51) Int. Cl.
 *F16J 15/44* (2006.01)
(52) U.S. Cl.
 CPC .................... *F16J 15/441* (2013.01)
(58) Field of Classification Search
 CPC ........ F16J 15/34; F16J 15/3464; F16J 15/348; F16J 15/44; F16J 15/441
 See application file for complete search history.

(56) References Cited

U.S. PATENT DOCUMENTS

| | | | | |
|---|---|---|---|---|
| 3,841,642 A | * | 10/1974 | Kirker, Jr. ................ | F16J 15/38 277/373 |
| 6,679,678 B2 | * | 1/2004 | Giesler ................... | F01D 11/00 277/372 |
| 8,485,530 B2 | * | 7/2013 | Johansson ............... | F16J 15/348 277/373 |
| 10,612,667 B2 | * | 4/2020 | Ventura ................. | F16J 15/3464 |
| 2015/0159496 A1 | | 6/2015 | Pouzet et al. | |
| 2019/0264814 A1 | | 8/2019 | Manry | |

FOREIGN PATENT DOCUMENTS

| | | |
|---|---|---|
| WO | 2012136917 A1 | 10/2012 |
| WO | 2016179608 A2 | 11/2016 |

OTHER PUBLICATIONS

Search report from the British Patent Office dated Apr. 17, 2020 in related application No. GB1917363.2.

* cited by examiner

*Primary Examiner* — Gilbert Y Lee
(74) *Attorney, Agent, or Firm* — J-Tek Law PLLC; Scott T. Wakeman; Mark A. Ussai

(57) ABSTRACT

An anti-rotation device is for a circumferential seal disposed within a housing and having an annular body and one or more openings with facing first and second sides. The device includes at least one and preferably a plurality of lugs each having a first axial end coupled with the housing, preferably through an annular carrier disposed within the housing, an opposing second axial end, inner and outer radial ends each extending axially between the first and second axial ends, and opposing first and second retainer surfaces extending axially between the first and second axial ends and radially between the inner and outer radial ends. At least one retainer surface is convexly curved and each lug is disposable within a seal opening such that the convexly curved retainer surface is contactable with one of the seal opening sides to prevent angular displacement of the seal with respect to the housing.

20 Claims, 16 Drawing Sheets

CROWNED ANTI-ROTATION DEVICE FOR CIRCUMFERENTIAL SEALS

BACKGROUND OF THE INVENTION

The present invention relates to seals, and more particularly to devices for preventing angular displacement of circumferential seals.

Circumferential seals are known and typically include an annular body disposed about a shaft or a sleeve mounted on the shaft. The seal has an inner circumferential seal that seals against the shaft or sleeve as the shaft rotates about a central axis. Certain circumferential seals are "lift" seals that displace radially outwardly during shaft rotation to reduce wear on the seal. As the seal is typically free to "float" within the seal housing, some means must be provided to prevent angular displacement of the seal about the shaft axis.

SUMMARY OF THE INVENTION

In one aspect, the present invention is an anti-rotation device for a circumferential seal, the seal being disposed within a housing and having an annular body with a central axis, opposing axial ends and at least one opening extending generally axially between the axial ends and having facing first and second sides. The anti-rotation device comprises at least one lug having a first axial end coupled with the housing, an opposing second, free axial end and inner and outer radial ends each extending axially between the first and second axial ends. Opposing first and second retainer surfaces extend axially between the first and second axial ends and radially between the inner and outer radial ends, at least one of the first and second retainer surfaces being generally convexly curved. The at least one lug is disposable at least partially within the at least one seal opening such that the convexly curved retainer surface is contactable with one of the first and second seal opening sides to prevent angular displacement of the seal with respect to the housing.

In another aspect, the present invention is again an anti-rotation device for a circumferential seal, the seal being disposed within a housing and having an annular body with a central axis, opposing axial ends and at least one opening extending generally axially between the axial ends and having facing first and second sides. The anti-rotation device comprises a generally annular carrier disposed within the housing and spaced axially from the seal, the carrier having opposing first and second axial faces. At least one lug extends axially from the carrier first face, the lug having a first axial end coupled with the carrier, an opposing second, free axial end and inner and outer radial ends each extending axially between the first and second axial ends. Opposing first and second retainer surfaces extend axially between the first and second axial ends and radially between the inner and outer radial ends, at least one of the first and second retainer surfaces being generally convexly curved. The at least one lug is disposable at least partially within the at least one seal opening such that the convexly curved retainer surface is contactable with one of the first and second seal opening sides to prevent angular displacement of the seal with respect to the housing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 16, is a radial cross-sectional view of a lug engaged with the seal, showing the seal in an initial position in FIG. 16A and a radially-outwardly displaced position in FIG. 16B;

FIG. 17, is a radial cross-sectional view of a lug engaged with the seal, the lug being in angularly misaligned or "cocked" position, and showing the seal in an initial position in FIG. 17A and a radially-outwardly displaced position in FIG. 17B.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
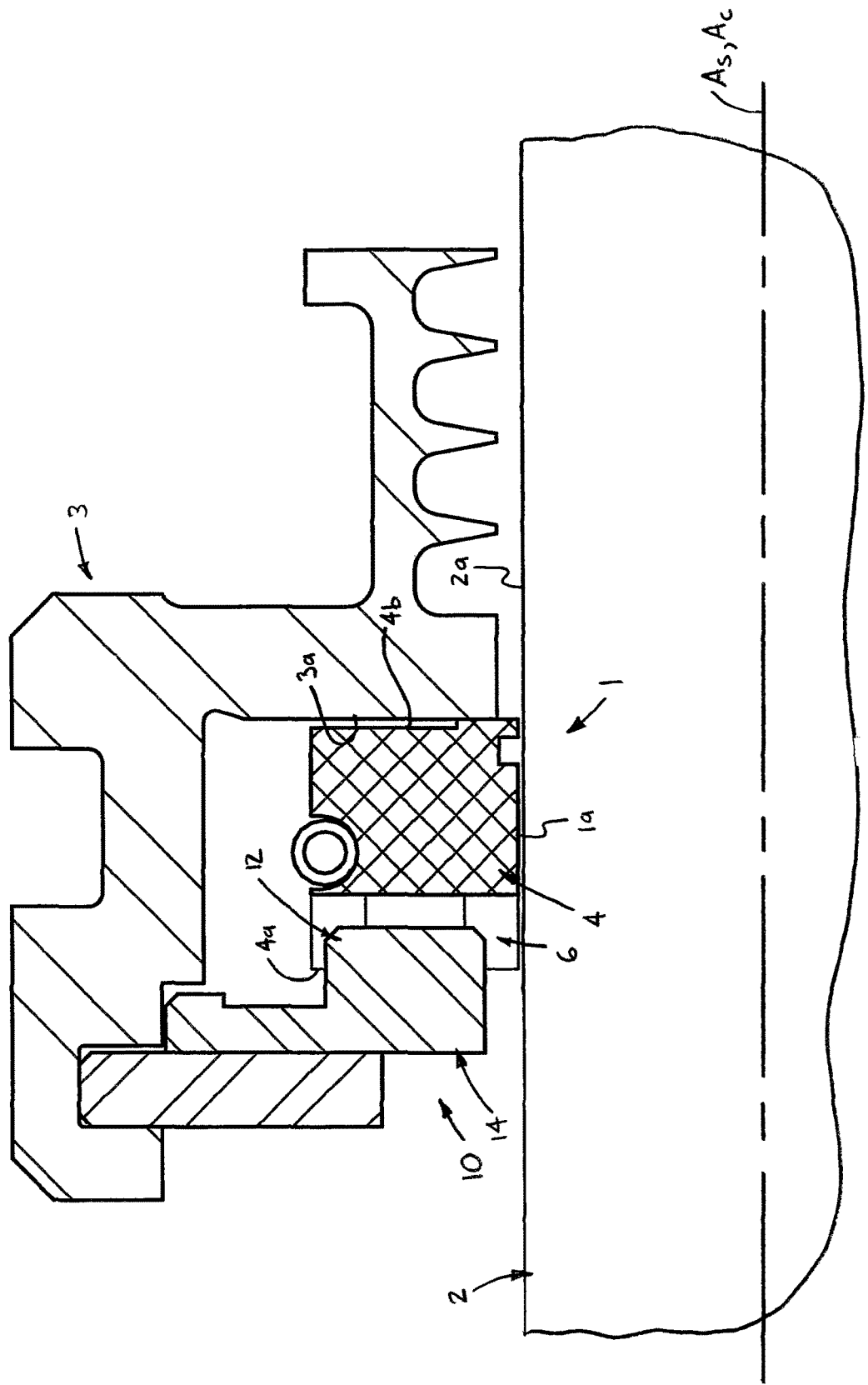
FIG. 1 is an axial cross-sectional view of a first construction anti-rotation device engaged with a seal of a single seal assembly, the seal being shown disposed about a shaft and within a housing.
Figure 2:
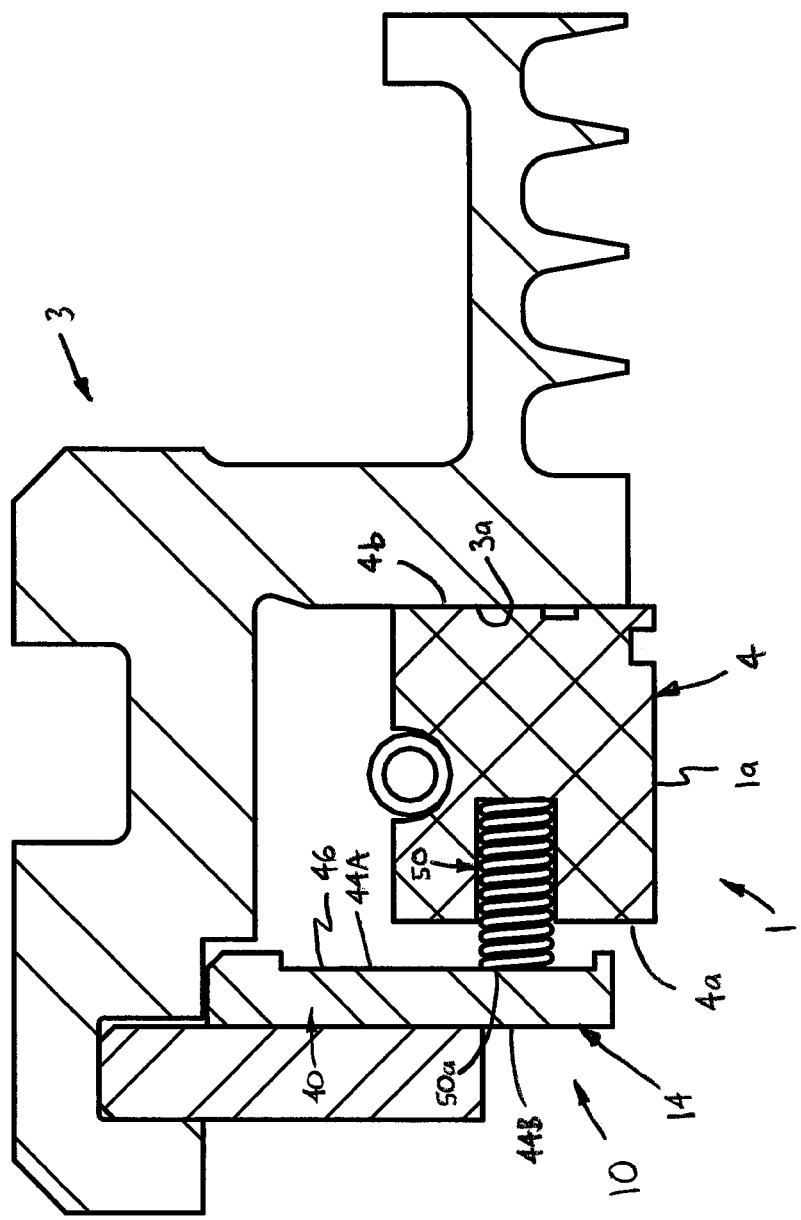
FIG. 2 is an axial cross-sectional view of the single seal assembly of FIG. 1, shown through a biasing spring.
Figure 3:
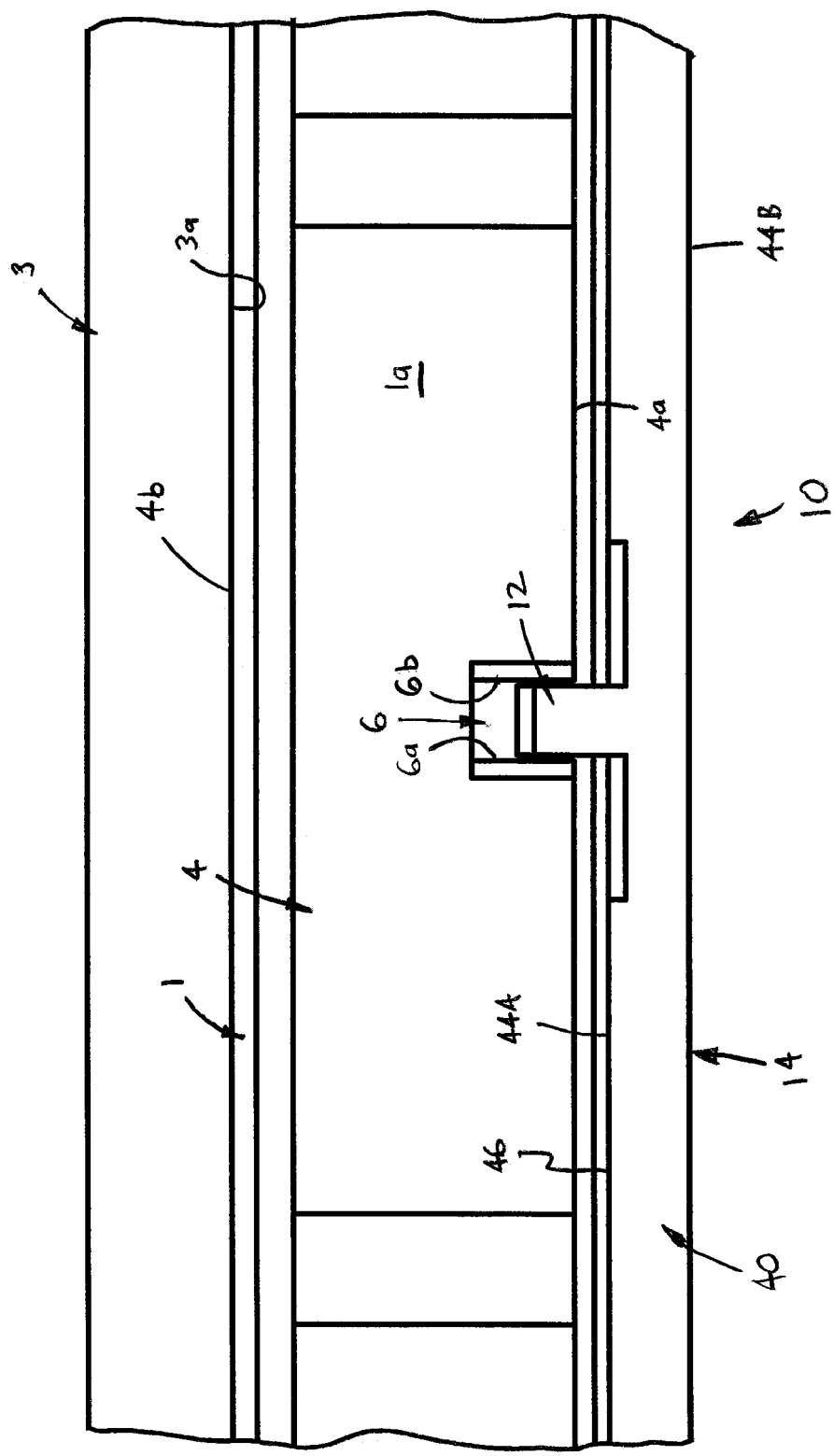
FIG. 3 is a broken-away, enlarged bottom view of the first construction retainer device showing a lug engaged with a single seal.
Figure 4:
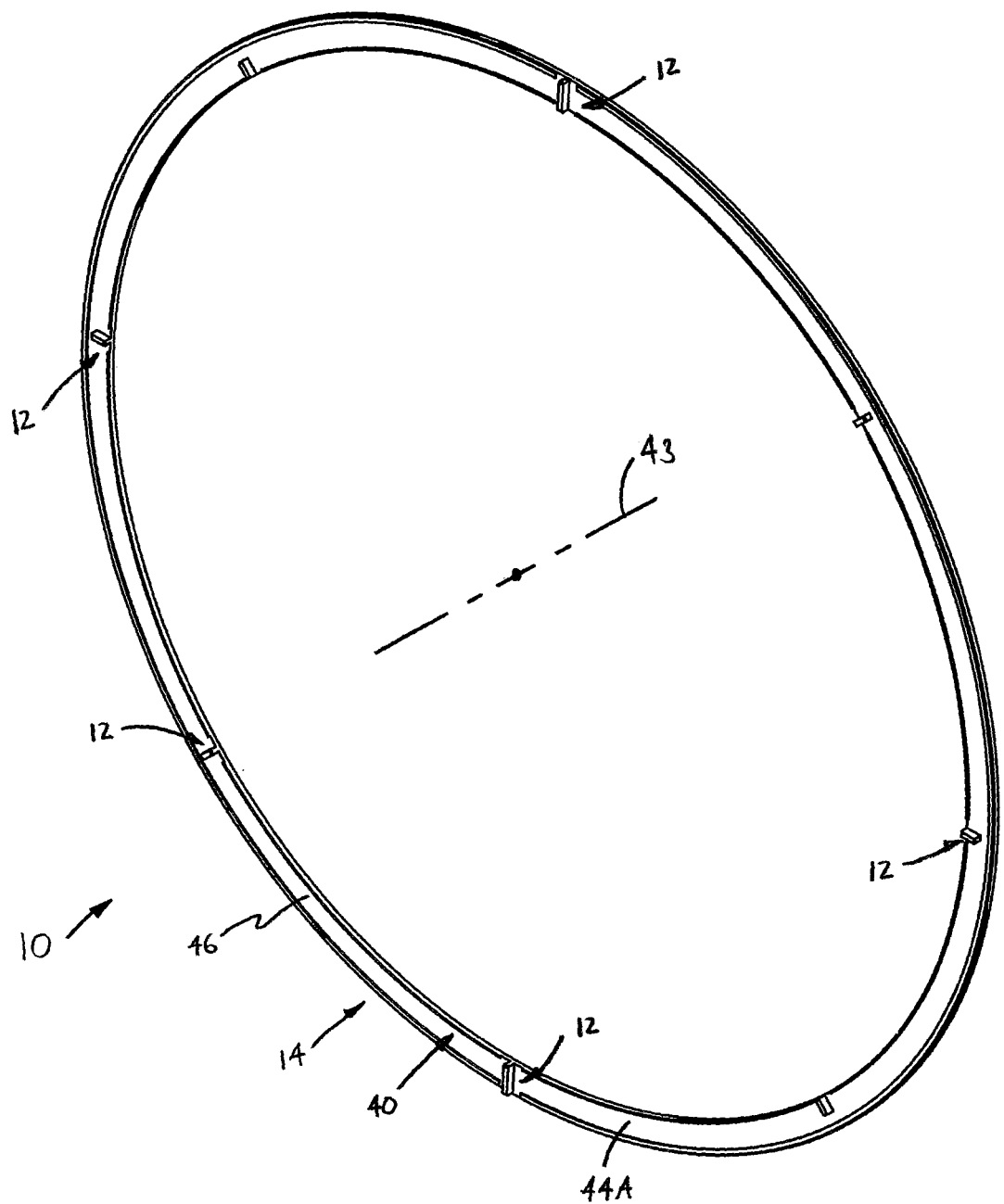
FIG. 4 is a perspective view of the first construction retainer device.
Figure 5:
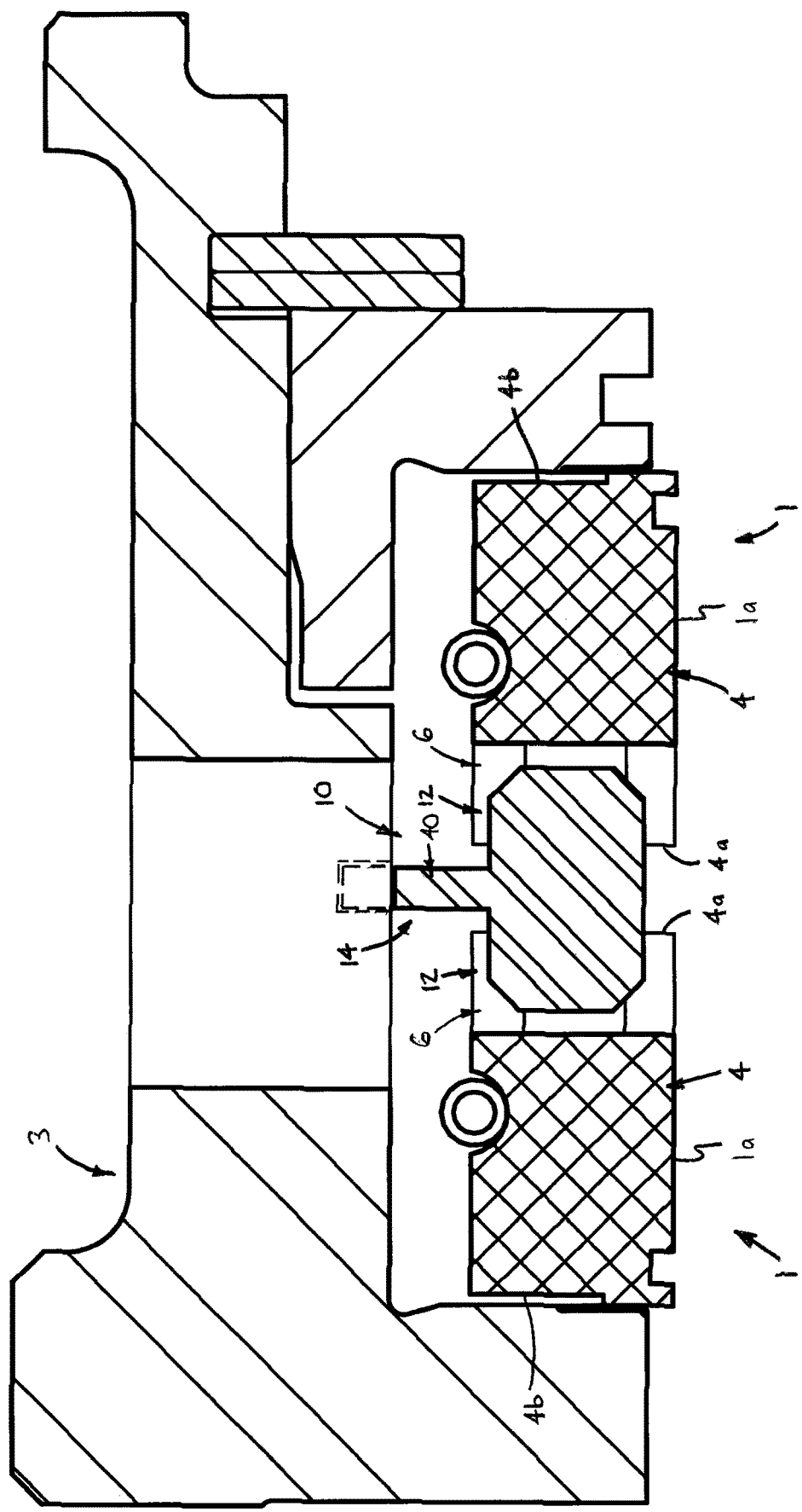
FIG. 5 is an axial cross-sectional view of a second construction anti-rotation device engaged with two seals of a double or tandem seal assembly, the seals being shown disposed within a housing.

Referring now to the drawings in detail, wherein like numbers are used to indicate like elements throughout, there is shown in FIGS. 1-18 an anti-rotation device 10 for a circumferential seal 1 with an inner circumferential sealing surface 1a for sealing about the outer surface 2a of an inner member 2, such as a cylindrical or tubular shaft, rotatable about a central axis $A_S$. The seal 1 is disposed within a generally annular housing 3 and includes an annular body 4 with a central axis $A_C$, which is substantially collinear with the shaft axis $A_S$, and opposing axial ends 4a, 4b, the end 4b being configured to seal against a radial surface 3a of the housing 3, as indicated in FIGS. 1-3. Preferably, the seal annular body 4 is formed of a plurality of arcuate seal segments (not depicted) having opposing circumferential ends each coupled with a separate corresponding end of two adjacent seal segments to form the annular body 4. Most preferably, the seal 4 is a "lift" seal capable of displacing radially outwardly from the outer surface of the inner member 2 to reduce friction on the sealing surface 1a. As such, each seal segment is provided with one or more lift ramps 5 (FIG. 6), or the shaft 2 (or a runner (not shown) disposed on the shaft 2) is provided with a plurality of lift grooves (none shown), to create a radially outwardly directed force on each of the seal segments. Further, the seal annular body 4 also has at least one opening 6 extending generally axially between the axial ends 4a, 4b and having facing first and second sides 6a, 6b, as shown in FIGS. 1, 3, 6, 16 and 17, and preferably having at least one opening 6 in each seal segment (not depicted).

Figure 14:
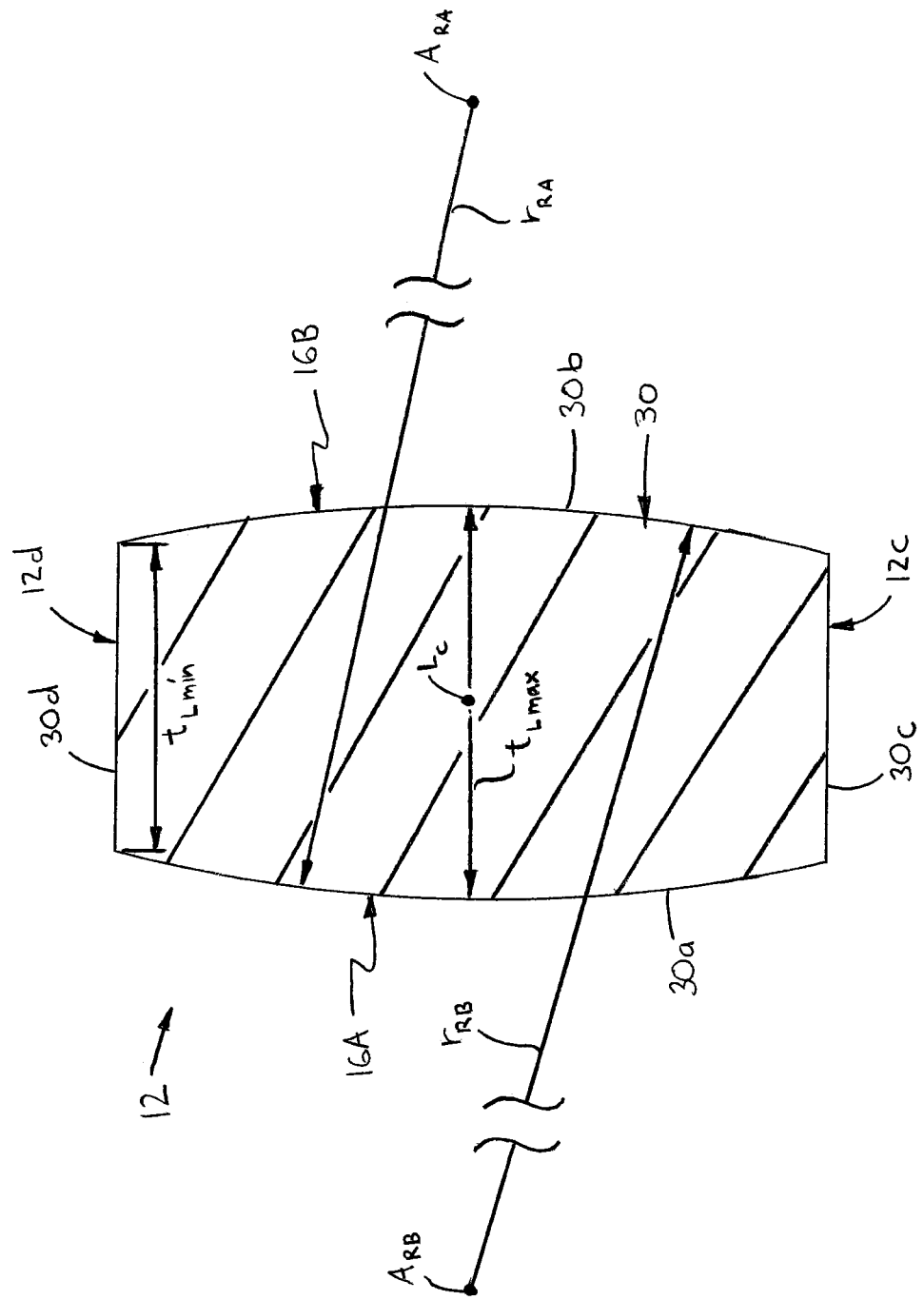
FIG. 14 is a radial cross-section of a preferred, double curved lug of the retainer device.
Figure 15:
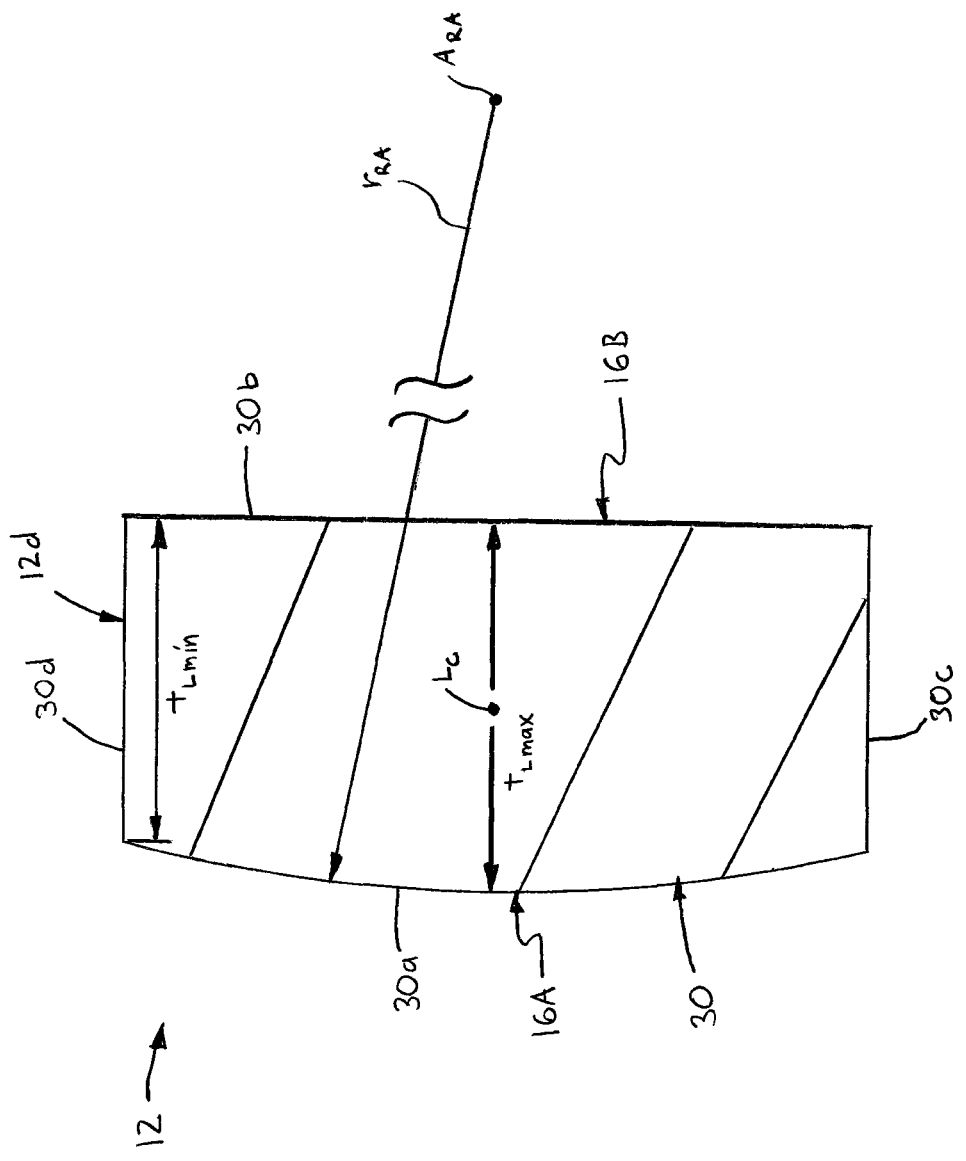
FIG. 15 is a radial cross-section of an alternative, single curved lug of the retainer device.

The retainer device 10 basically comprises at least and preferably a plurality of lugs 12 each having a first axial end 12a coupled with the housing 3, either directly or through a carrier 14 as described below, and an opposing second, free axial end 12 disposable within a separate one of the seal openings 6, as discussed below. Each lug 12 further has inner and outer radial ends 12c, 12d, respectively, each extending axially between the first and second axial ends 12a, 12b, and opposing first and second retainer surfaces 16A, 16B each extending axially between the first and second axial ends 12a, 12b and radially between the inner and outer radial ends 12c, 12d. At least one, and preferably both, of the first and second retainer surfaces 16A, 16B is "crowned" or generally convexly curved, such that the two retainer surfaces 16A, 16B extend outwardly from the lug centerline $L_C$ in opposing circumferential directions with respect to the seal axis $A_S$. As such, each lug 12 has a thickness $t_L$ defined between the first and second retainer surfaces 16A, 16B that varies radially between a least value $t_{L\ min}$ proximal to at least one of, and preferably both of, the inner and outer radial ends 12c, 12d and a greatest value $t_L\ max$ at a central position generally between, and preferably centered between, the inner and outer radial ends 12c, 12d, as indicated in FIGS. 14 and 15.

Preferably, the at least one convexly curved retainer surface 16A and/or 16B has a relatively flat or "shallow" curvature, for reasons discussed below. Specifically, each convexly curved retainer surfaces 16A, 16B is preferably formed as a portion of a generally cylindrical surface section having a radius $r_{RA}$, $r_{RB}$, respectively, extending from a separate axis $A_{RA}$, $A_{RB}$, respectively, on opposing sides of and spaced from the lug centerline $L_C$. Each radius $r_{RA}$, $r_{RB}$ is selected to have a sufficient magnitude to provide a relatively shallow or "flatter" convexly curved surface 16A and/or 16B in order to eliminate adverse conditions with prior art anti-rotation devices as described below.

Preferably, the magnitude of each radius $r_{RA}$ and/or $r_{RB}$ is a function of $H_L$ and $\theta_T$ and is optimally calculated using the following equation:

$$r_R = (H_L^2 + 4C_P^2)/8C_P$$

where: $H_L$=lug height=radial distance between 12c and 12d

$$C_P = (H_L/2)*\tan \theta_T$$

$\theta_T$=total angular misalignment=$\theta_L + \theta_O$
$\theta_L$=angular misalignment of lug from central axis $A_S$
$\theta_O$=angular misalignment opening side 6a or 6b from axis $A_S$ With a preferred lug height $H_L$ (see FIG. 18) and desired maximum angular misalignments of $\theta_L$ and $\theta_O$, the optimum magnitude of the radius of each retainer surface 16A, 16B is calculated. Most preferably, the lugs 12 are formed such that a ratio of the retainer surface radius $r_{RA}$ and/or $r_{RB}$ to the lug height $H_L$, i.e. $r_R/H_L$, is within the range of between about 2.4 and about 2.8.

Referring to FIGS. 1, 5, 16 and 17, the at least one lug 12 is disposable at least partially within the at least one seal opening 6 such that the convexly curved retainer surface 16A or 16B is contactable with one of the first and second seal opening sides 6a or 6b to prevent angular displacement of the seal 1 about the central axis $A_C$ and with respect to the housing 3. More specifically, each of the one or more lugs 12 is fixed relative to the shaft axis $A_S$ due to coupling of the first lug end 12a with the stationary housing 3, such that any torque on the seal body 4 pushes one seal opening side 6a or 6b against the facing lug retainer surface 16A, 16B of the stationary lug 12, thereby preventing turning or angular displacement of the seal 1 about the central axis $A_C$. Further, when the shaft 2 is rotatable in only one direction about the axis $A_C$, the lug 12 may be formed with only one convexly curved contact surface 16A or 16B, as depicted in FIG. 15, since torque on the seal 1 will occur in only the direction of rotation, and thus the lug 12 will engage against only one seal opening side 6a or 6b. However, when the seal 12 is rotatable in either direction, preferably both retainer surfaces 16A, 16B are convexly curved, as best shown in FIGS. 8, 9, 11, 14, 16 and 17, as either seal opening side 6a or 6b may engage against the lug 12 to prevent angular displacement.

Further, as the seal 1 is preferably a lift seal, each seal segment must be capable of displacing radially outwardly, and alternatively radially inwardly, with respect to the shaft central axis $A_S$. During such radial movement of the seal segments, at least one of the sides 6a, 6b of each segment opening 6, depending on the direction of torque T on the seal 1, slides against the respective lug retainer surface 16A or 16B. To eliminate a significant issue with prior art anti-rotation devices as discussed below, each lug 12 is configured such that a radially and axially-extending central contact section 17 of each convexly curved retainer surface 16A and/or 16B engages against the proximal, facing one of the first and second seal opening sides 6a, 6b, respectively, while the remainder of the curved retainer surface 16A, 16B is spaced circumferentially (i.e., about the central axis $A_C$) from the one seal opening side 16A, 16B, as depicted in FIGS. 16 and 17.

Figure 16A:
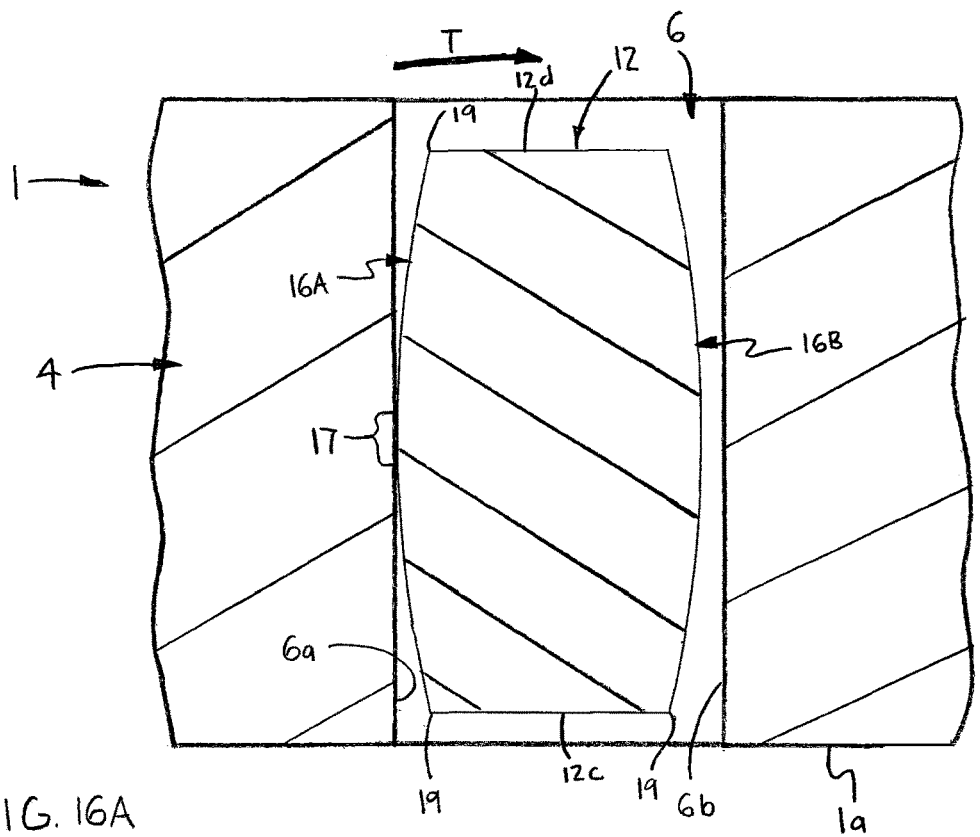
FIGS. 16A and 16B, collectively
Figure 16B:
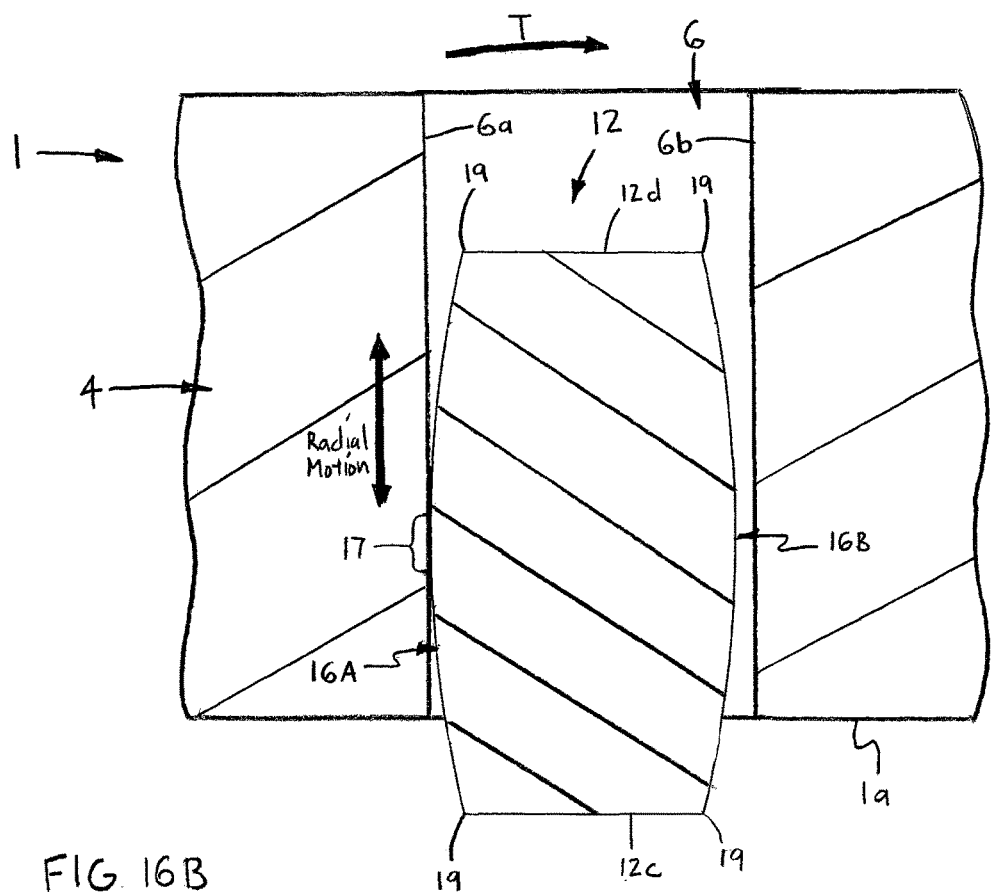
Figure 17A:
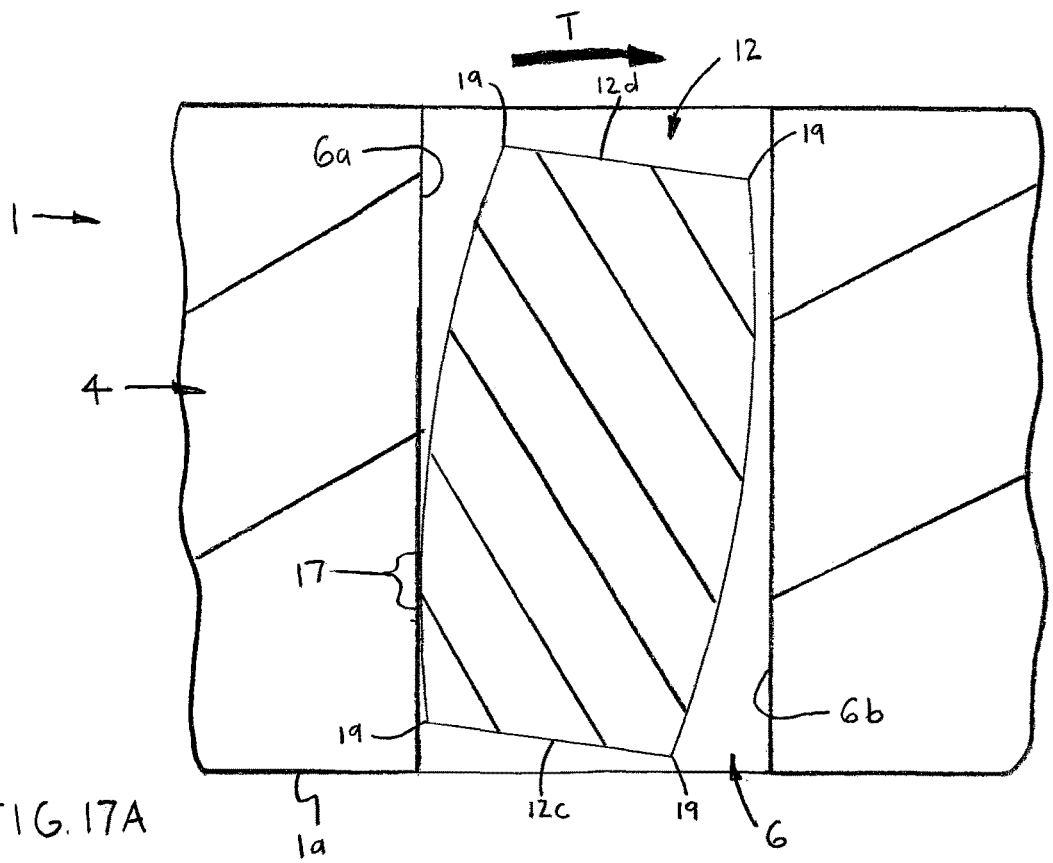
FIGS. 17A and 17B, collectively
Figure 17B:
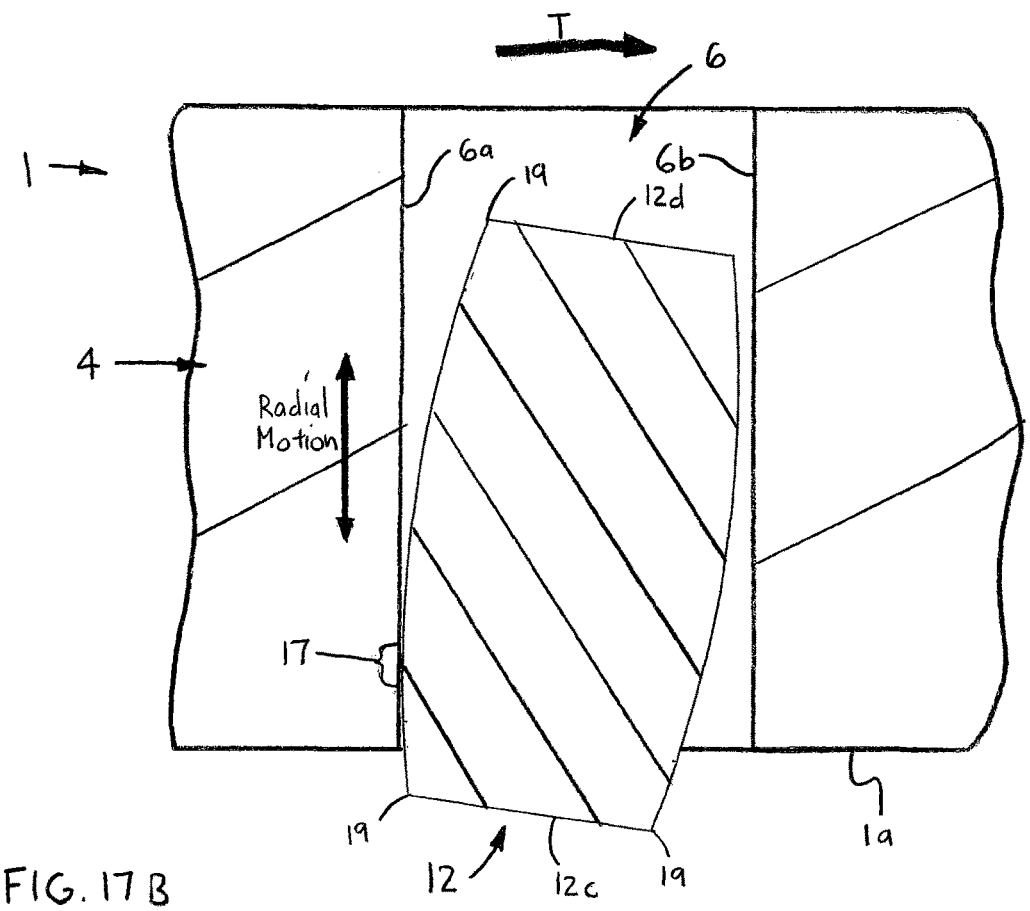
Figure 18:
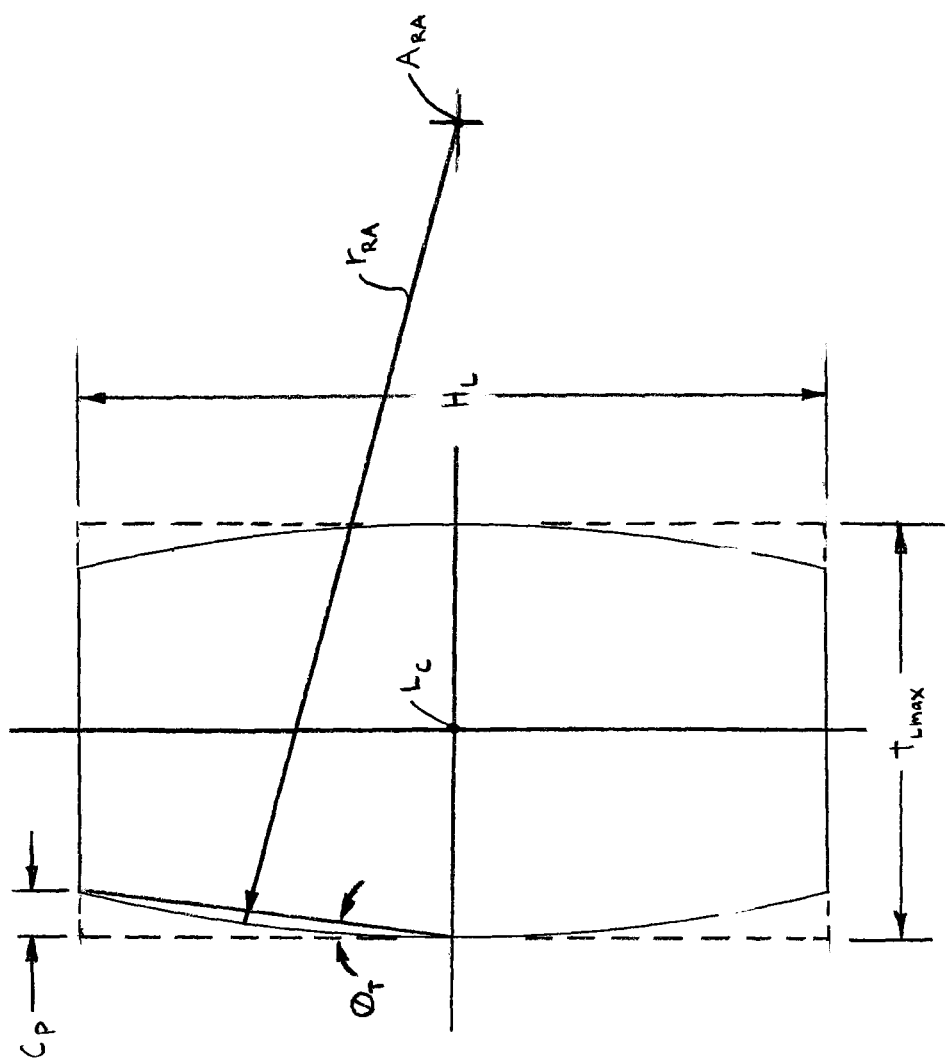
FIG. 18 is a more diagrammatic radial cross-sectional view of a lug indicating the dimensions used to calculate an optimal radius of a retainer surface.

When each lug 12 is substantially angularly aligned with the seal 1, the central contact section 17 is generally centered between the lug radial ends 12c, 12d, as shown in FIG. 16. However, when a lug 12 is angularly misaligned or "cocked" with respect to the seal 1, the central contact section 17 is located more proximal to one lug radial end 12c or 12d, as depicted in FIG. 17. In any case, each seal opening side 6a and/or 6b slides primarily against the relatively shallow retainer surface central section 17, such that contact pressure is distributed over a greater area of the seal side 6a, 6b, as indicated in FIGS. 16 and 17.

Such greater contact area is beneficial over the more linear contact of circular cylindrical pins of prior art devices, which eventually leads to erosion of the seal material until the pin embeds within the seal, thereby inhibiting or preventing radial movement of, and in some cases fracturing, the seal. Additionally, with seal contact occurring in a central section 17 of each convexly curved retainer surface(s) 16A and/or 16B, and the resulting circumferential spacing of the radial ends 12c, 12d from the seal 1, contact with the relatively narrow or sharp edges 19 at the lug radial ends 12c, 12d is prevented. In prior art anti-rotation devices having rectangular bars or blades, such edge contact erodes the material of a seal and leads to embedding the bar/blade into the seal, which also inhibits/prevents seal radial movement.

Referring to FIGS. 8-12, each of the one more lugs 12 includes a generally rectangular solid body 30, with the two largest faces 30a, 30b providing the retainer surfaces 16A, 16B, two rectangular faces 30c, 30d providing the inner and outer radial ends 12c, 12d, respectively, and at least one end face 30e providing the second, free axial end 12b. With the preferred lug 12 having two convexly curved retainer surfaces 16A, 16B, the body 30 has radial cross-sections with a generally truncated elliptical shape, as shown in FIGS. 14, 16 and 17. In certain constructions shown in FIGS. 8-12, each lug 12 is a component discrete from the carrier 14 or the housing 3, whether permanently attached to or removably connected with either part, and includes another end face 30f and a coupler projection 32 extending generally axially from the face 30f. The projection 32 of each lug 12 is preferably circular cylindrical and is disposable within a separate coupler opening 15 (FIG. 12) of the carrier 14 or the housing 3 (structure not shown).

Figure 13:
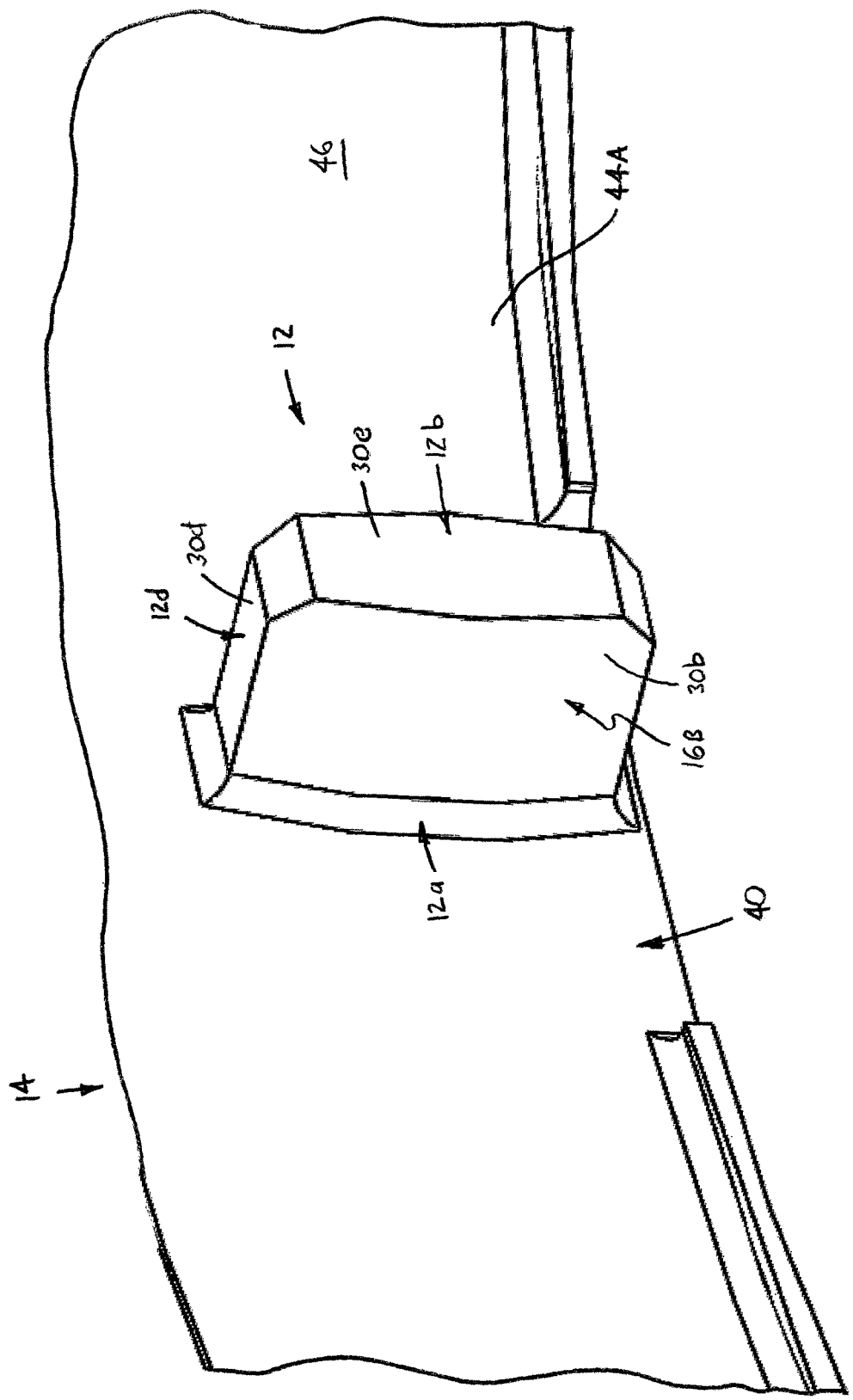
FIG. 13 is a perspective view from the top of a lug integral with a carrier of the retainer device.

In other constructions as depicted in FIG. 13, the first axial end 12a of each lug 12 is integrally formed with the carrier 14 (as shown) or with the housing (not depicted), such that the rectangular body 30 does not include an identifiable face opposing the end face 30e. Further, at least the retainer surfaces 16A, 16B, and preferably the entire body 30 and surfaces of the preferred carrier 14, of each lug 12 is coated with a friction-reducing material, most preferably a high phosphorous electroless nickel, but may be any other appropriate coating material.

Referring now to FIGS. 1-7 and 13, the retainer device 10 preferably also comprises the carrier 14, which is disposed within and coupled with the housing 3 such that the carrier 14 is angularly fixed or non-rotatable about the shaft axis $A_S$. The carrier 14 is spaced axially from the seal(s) 12, and also disposed between the two seals 12 in the double seal assembly shown in FIGS. 5-7. The carrier 14 includes a generally annular body 40, preferably formed as a generally washer-like circular plate, and has a central axis 43 and opposing first and second axial faces 44A, 44B. The first end 12a of each lug 12 is removably coupled with, permanently attached to, or integrally formed with the carrier 14; in the single seal assembly shown in FIGS. 1-4, the lugs 12 extend only from the carrier first face 44A, and in the double or tandem spring assembly depicted in FIGS. 5-7, the lugs 12 extend from both faces 44A, 44B. Further, the plurality of lugs 12 are spaced circumferentially about the carrier central axis 43, and thus about the shaft axis $A_C$, with each one of the lugs 12 being disposed at least partially within a separate one of a plurality of the seal openings 6. Although the carrier 14 is preferred, the retainer device 10 may be alternatively formed without the carrier, in which case the first axial end 12a of each lug 12 is directly connected with the housing 3 by any appropriate means (e.g., integrally formed or removably or permanently attached).

Figure 6:
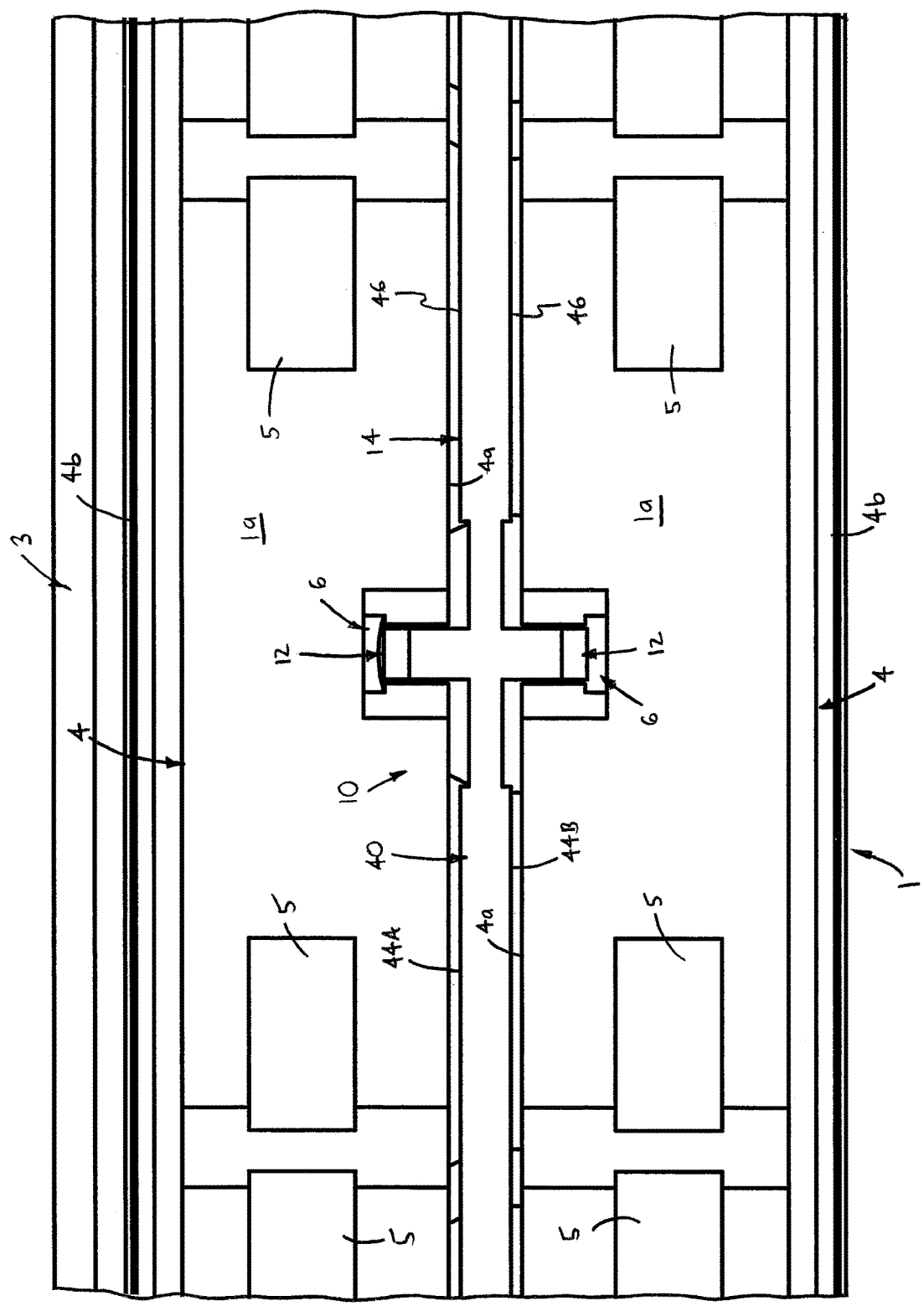
FIG. 6 is a broken-away, enlarged bottom view of the second construction retainer device showing two lugs each engaged with a separate one of the two seals.
Figure 7:
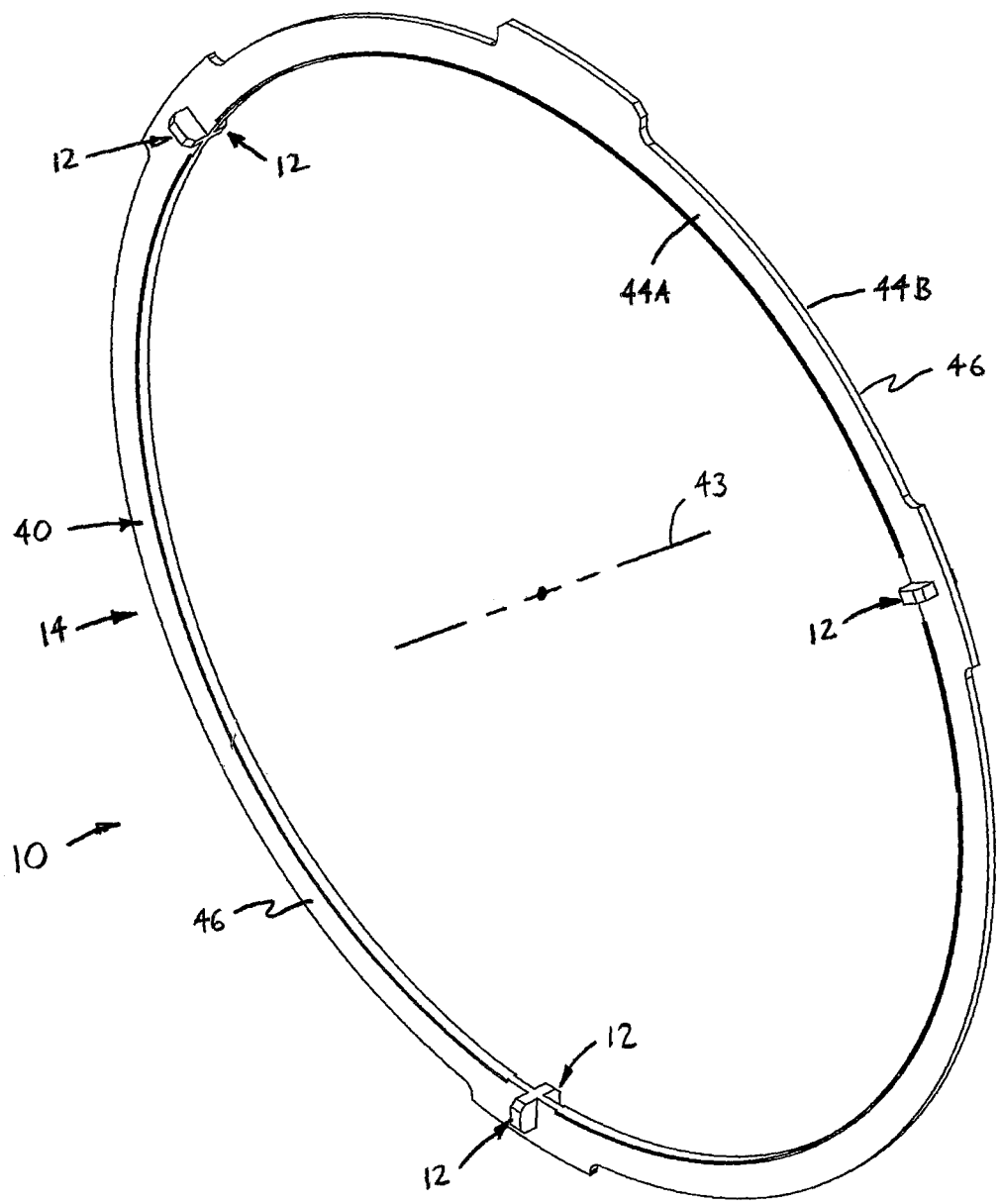
FIG. 7 is a perspective view of the second construction retainer device.
Figure 8:
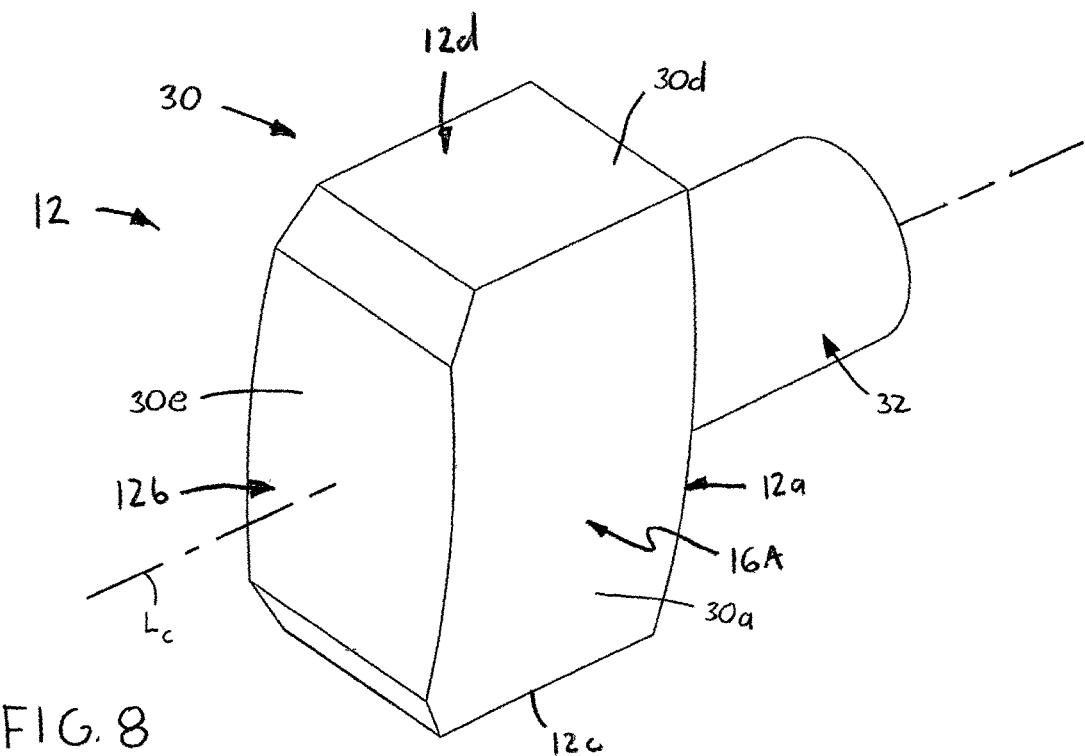
FIG. 8 is a perspective view from the top of a separable lug of the retainer device.
Figure 9:
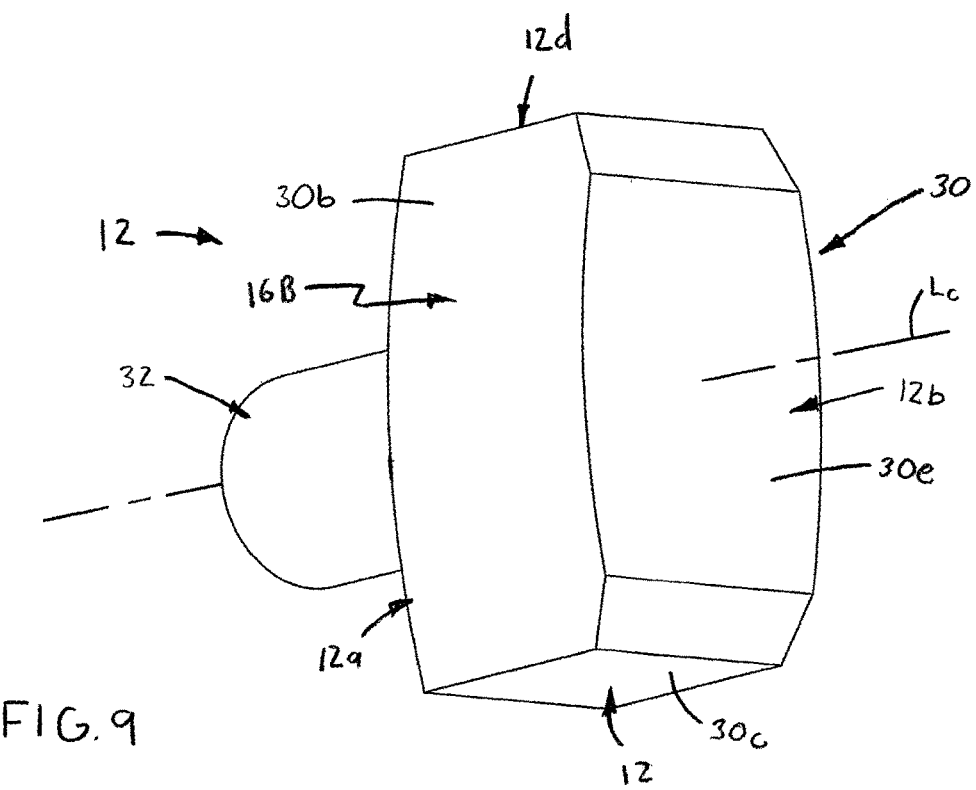
FIG. 9 is a perspective view from the bottom of the lug of FIG. 8.
Figure 11:
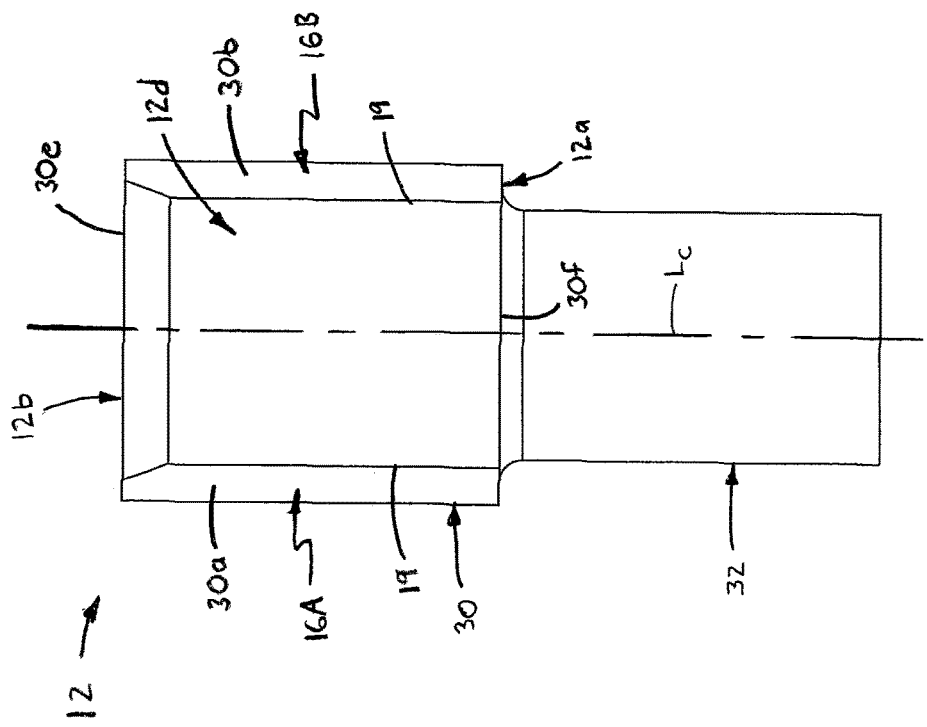
FIG. 11 is a top plan view of the lug of FIG. 8.
Figure 10:
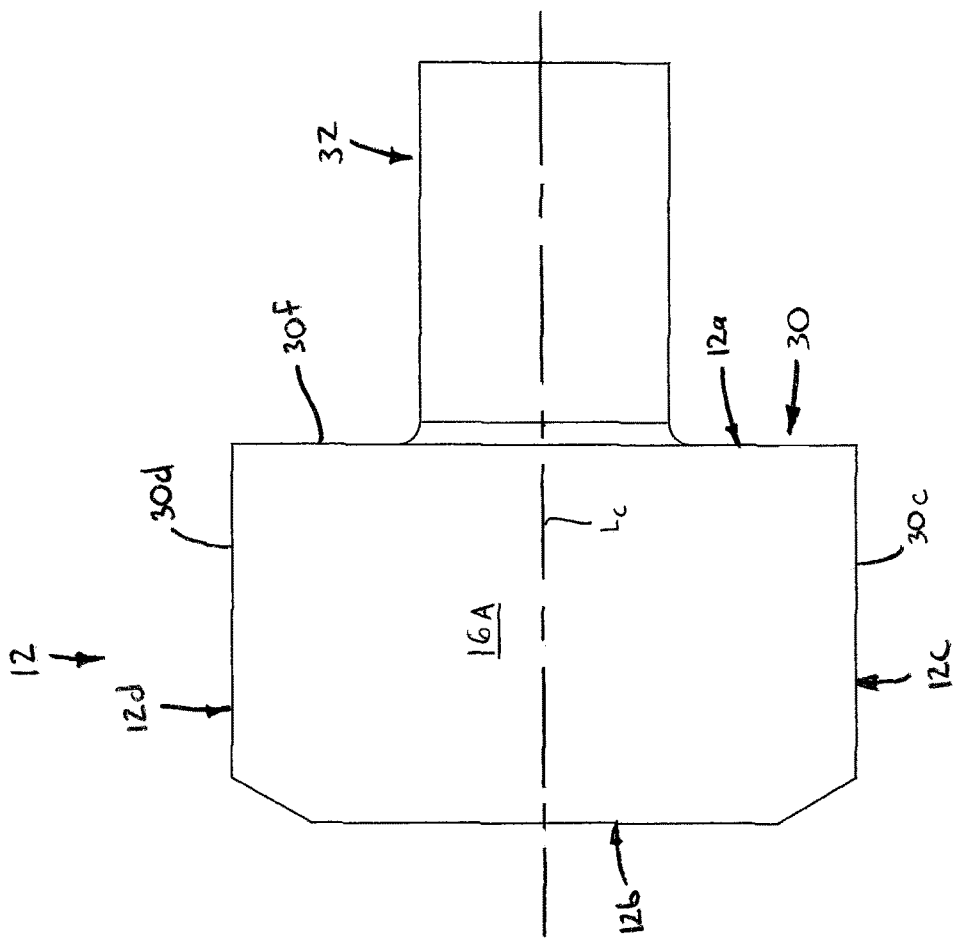
FIG. 10 is a side plan view of the lug of FIG. 8.
Figure 12:
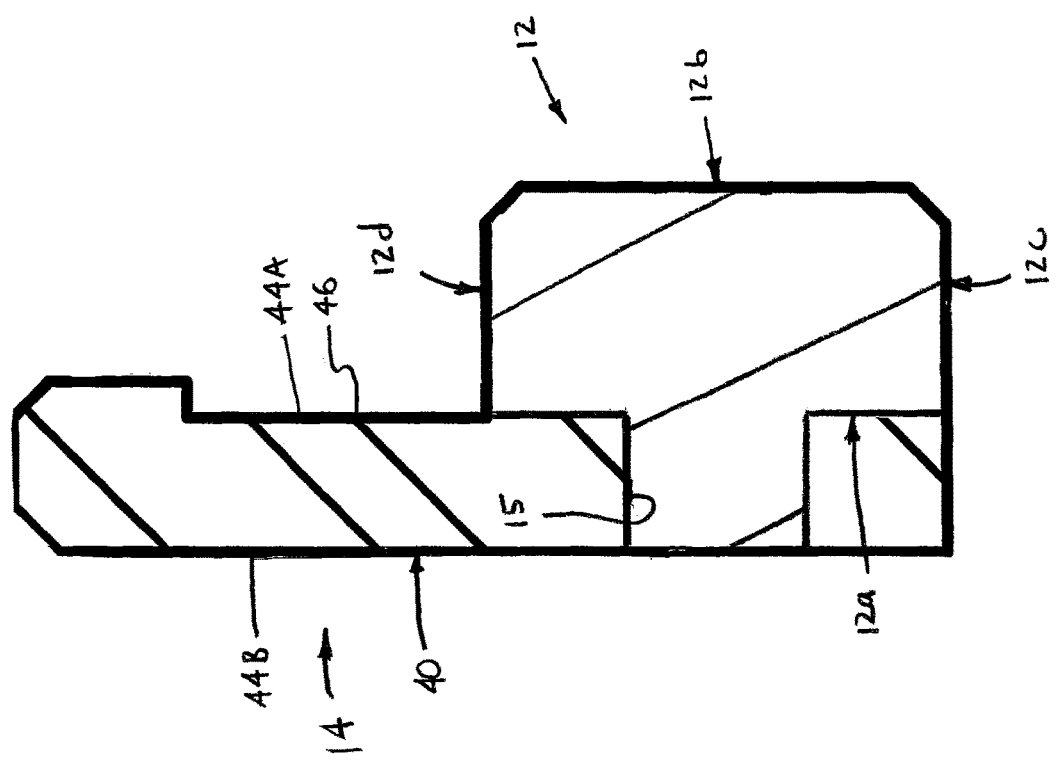
FIG. 12 is an axial cross-sectional view of the lug of FIG. 8 shown installed within a carrier.

In addition to "carrying" the lugs 12, the carrier 14 also functions as a spring retainer; more specifically, the carrier first axial face 44A provides a spring retention surface 46 for an end 50a of at least one spring 50 used to axially bias the seal 2 in a single seal assembly (FIG. 2), and in a double seal assembly, both carrier faces 44A, 44B provide a separate retention surface 46 for the ends 50a of a plurality of springs 50 (FIG. 6). Most preferably, the retainer device 10 is formed generally similarly to, with the exception of the structure of the lugs 12, the retainer device disclosed in U.S. patent application Ser. No. 15/908,109, filed on Feb. 28, 2018, the entire contents of which are incorporated by reference herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. An anti-rotation device for a circumferential seal, the seal being disposed within a housing and having an annular body with a central axis, opposing axial ends and at least one opening extending generally axially between the axial ends and having facing first and second sides, the device comprising:

at least one lug having a first axial end coupled with the housing, an opposing second, free axial end, inner and outer radial ends each extending axially between the first and second axial ends, and opposing first and second retainer surfaces extending axially between the first and second axial ends and radially between the inner and outer radial ends, at least one of the first and second retainer surfaces being generally convexly curved, the at least one lug being disposable at least partially within the at least one seal opening such that the convexly curved retainer surface is contactable with one of the first and second seal opening sides to prevent angular displacement of the seal with respect to the housing.

2. The anti-rotation device as recited in claim 1 wherein the at least one lug is configured such that an axially-extending central section of the at least one convexly curved retainer surface engages against the one of the first and second seal opening sides while the remainder of the curved retainer surface is spaced circumferentially from the one seal opening side.

3. The anti-rotation device as recited in claim 1 wherein the at least one lug has a thickness between the first and second retainer surfaces, the thickness varying radially between a least value proximal to at least one of the first and second radial ends and a greatest value at a central position between the first and second radial ends.

4. The anti-rotation device as recited in claim 1 wherein the lug has a centerline extending between the lug first and second axial ends and the at least one convexly curved retainer surface is formed as a portion of a generally cylindrical surface having a radius extending from an axis spaced from the lug centerline.

5. The anti-rotation device as recited in claim 4 wherein the lug has a height between the lug inner and outer radial ends and the lug is formed such that a ratio of the radius of the retainer surface to the lug height is within the range of between about 2.4 and about 2.8.

6. The anti-rotation device as recited in claim 1 wherein each one of the first and second retainer surfaces is convexly curved.

7. The anti-rotation device as recited in claim 6 wherein the at least one lug has a centerline extending between the first and second axial ends and each one first and second retainer surfaces extend outwardly from the centerline in opposing circumferential directions with respect to the seal axis.

8. The anti-rotation device as recited in claim 1 wherein the first axial end of the at least one lug is directly connected with the housing or with a carrier disposed within the housing.

9. The anti-rotation device as recited in claim 1 wherein the at least one lug includes a generally rectangular body.

10. The anti-rotation device as recited in claim 1 further comprising a generally annular carrier disposed within the housing, the first axial end of the at least one lug being removably coupled with the carrier, permanently attached to the carrier or integrally formed with the carrier.

11. The anti-rotation device as recited in claim 1 wherein the at least one lug includes a plurality of the lugs spaced circumferentially about the central axis, each one of the plurality of lugs being disposed at least partially within a separate one of a plurality of seal openings.

12. An anti-rotation device for a circumferential seal, the seal being disposed within a housing and having an annular body with a central axis, opposing axial ends and at least one opening extending generally axially between the axial ends and having facing first and second sides, the device comprising:
   a generally annular carrier disposed within the housing and spaced axially from the seal, the carrier having opposing first and second axial faces; and
   at least one lug extending axially from the carrier first face, the lug having a first axial end coupled with the carrier, an opposing second, free axial end, inner and outer radial ends each extending axially between the first and second axial ends, and opposing first and second retainer surfaces extending axially between the first and second axial ends and radially between the inner and outer radial ends, at least one of the first and second retainer surfaces being generally convexly curved, the at least one lug being disposable at least partially within the at least one seal opening such that the convexly curved retainer surface is contactable with one of the first and second seal opening sides to prevent angular displacement of the seal with respect to the housing.

13. The anti-rotation device as recited in claim 12 wherein the at least one lug is configured such that an axially-extending central section of the convexly curved retainer surface engages against the one of the first and second seal opening sides while the remainder of the curved retainer surface is spaced circumferentially from the one seal opening side.

14. The anti-rotation device as recited in claim 12 wherein the at least one lug has a thickness between the first and second retainer surfaces, the thickness varying radially between a least value proximal to one of the first and second radial ends and a greatest value at a central position between the first and second radial ends.

15. The anti-rotation device as recited in claim 12 wherein the at least one convexly curved retainer surface is formed as a generally cylindrical surface section.

16. The anti-rotation device as recited in claim 12 wherein each one of the first and second retainer surfaces is convexly curved.

17. The anti-rotation device as recited in claim 12 wherein the carrier includes a generally washer-like circular plate and the at least one lug includes a generally rectangular body.

18. The anti-rotation device as recited in claim 12 wherein the first axial end of the at least one lug is removably coupled with the carrier, permanently attached to the carrier or integrally formed with the carrier.

19. The anti-rotation device as recited in claim 12 wherein the at least one lug includes a plurality of the lugs spaced circumferentially about the central axis, each one of the plurality of lugs extending axially from the carrier first face and being disposed at least partially within a separate one of a plurality of seal openings.

20. The anti-rotation device as recited in claim 12 wherein the carrier first axial face provides a retention surface for an end of at least one spring for biasing the seal.

* * * * *